United States Patent
Twelves

(10) Patent No.: US 10,933,493 B2
(45) Date of Patent: Mar. 2, 2021

(54) ADDITIVE MANUFACTURING IN SITU STRESS RELIEF

(71) Applicant: United Technologies Corporation, Farmington, CT (US)

(72) Inventor: Wendell V. Twelves, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 295 days.

(21) Appl. No.: 15/714,033

(22) Filed: Sep. 25, 2017

(65) Prior Publication Data

US 2019/0091803 A1   Mar. 28, 2019

(51) Int. Cl.

| | |
|---|---|
| *B23K 26/342* | (2014.01) |
| *B33Y 50/02* | (2015.01) |
| *B23K 26/03* | (2006.01) |
| *B33Y 10/00* | (2015.01) |
| *B33Y 30/00* | (2015.01) |
| *B23K 15/00* | (2006.01) |
| *B23K 26/144* | (2014.01) |
| *B23K 26/70* | (2014.01) |
| *B23K 31/02* | (2006.01) |
| *B22F 3/105* | (2006.01) |

(52) U.S. Cl.
CPC .......... *B23K 26/342* (2015.10); *B22F 3/1055* (2013.01); *B23K 15/0086* (2013.01); *B23K 26/034* (2013.01); *B23K 26/144* (2015.10); *B23K 26/702* (2015.10); *B23K 31/02* (2013.01); *B33Y 50/02* (2014.12); *B22F 2003/1057* (2013.01); *B22F 2999/00* (2013.01); *B33Y 10/00* (2014.12); *B33Y 30/00* (2014.12)

(58) Field of Classification Search
CPC .... B23K 26/342; B23K 26/144; B23K 26/14; B23K 26/702; B23K 26/0006; B23K 15/0086; B23K 26/034; B23K 26/1464; B33Y 50/02; B33Y 50/00; B33Y 10/00; B33Y 30/00; B33Y 80/00; B22F 2003/1057; B22F 2999/00
USPC ........................................................ 219/76.1
See application file for complete search history.

(56) References Cited

U.S. PATENT DOCUMENTS

| | | |
|---|---|---|
| 2007/0205184 A1 | 9/2007 | Mazumber et al. |
| 2009/0283501 A1* | 11/2009 | Erikson ................. B22F 3/1055 219/76.1 |
| 2016/0074965 A1 | 3/2016 | Jakimov et al. |
| 2016/0368052 A1 | 12/2016 | Jakimov et al. |

(Continued)

FOREIGN PATENT DOCUMENTS

EP   3132885 A1   2/2017

OTHER PUBLICATIONS

European Search Report dated Feb. 19, 2019 issued for corresponding European Patent Application No. 18196692.0.

*Primary Examiner* — Ibrahime A Abraham
*Assistant Examiner* — Bonita Khlok
(74) *Attorney, Agent, or Firm* — Bachman & LaPointe, P.C.

(57) ABSTRACT

An additive manufacturing system includes a build plate; a deposition system operable to dispense material as a melt pool to grow a workpiece on the build plate; a sensor system operable to determine a temperature of the workpiece being grown on the build plate adjacent to the melt pool; and a heater system operable to selectively heat the workpiece between the melt pool and the build plate.

15 Claims, 5 Drawing Sheets

(56) References Cited

U.S. PATENT DOCUMENTS

| | | | |
|---|---|---|---|
| 2016/0370007 A1* | 12/2016 | Hongoh | B22F 3/1055 |
| 2017/0051386 A1* | 2/2017 | Carter | C22F 1/10 |
| 2017/0217093 A1 | 8/2017 | DeMuth et al. | |
| 2019/0047226 A1* | 2/2019 | Ishikawa | B33Y 10/00 |

* cited by examiner

ADDITIVE MANUFACTURING IN SITU STRESS RELIEF

BACKGROUND

The present disclosure relates generally to additive manufacturing systems and processes, and more particularly, to stress relief during the additive manufacturing build process.

Additive manufacturing build processes such as Laser Freeform Manufacturing Technology (LFMT) are used to deposit "freeform" metal components with mechanical properties comparable to wrought materials. A build plate is often required as a base for the build. The build plate may be incorporated into the final part or may be removed when the freeform build is complete.

There is a natural shrinkage that occurs when the additive manufacturing material solidifies from a liquid molten state. Then, further shrinkage occurs as the material cools from the solidification temperature to room temperature. This results in internal residual stresses and distortion. As free form metal additive manufacturing parts increase in size, for example, a gas turbine engine case that may be three or four feet in diameter, the shrinkage may be quite significant. The shrinkage may be significant enough to crack the part or break the part from the build plate.

In an effort to avoid such damage, the build may be interrupted multiple times for external stress relief operations. Typically, in the example of a gas turbine engine case, external stress relief operations are performed every 3 to 6 inches of build. As engine cases are typically three to four feet in height from the build plate, a significant number of interruptions are required. As the parts become larger, even with such interruptions for stress relief, the moment of inertia caused by the shrinkage becomes more severe such that the potential for cracks or the potential for the part to separate from the build plate significantly increases.

SUMMARY

An additive manufacturing system according to one disclosed non-limiting embodiment of the present disclosure includes a build plate; a deposition system operable to dispense material as a melt pool to additively manufacture a workpiece on the build plate; a sensor system operable to determine a temperature of the workpiece during additive manufacturing of workpiece; and a heater system operable to selectively heat the workpiece between the melt pool and the build plate during the additive manufacturing.

A further aspect of the present disclosure includes a control in communication with the sensor system and the heater system, the control operable to control the heater system in response to a temperature measured on the workpiece by the sensor system to reduce a temperature gradient of the workpiece between the melt pool and the build plate.

A further aspect of the present disclosure includes that the sensor system comprises a multiple of temperature sensors arranged around the build plate.

A further aspect of the present disclosure includes that the heater system comprises a multiple of heaters arranged around the build plate.

A further aspect of the present disclosure includes that the multiple of temperature sensors alternate with the multiple of heaters.

A further aspect of the present disclosure includes that at least one of the multiple of temperature sensors is an infrared camera.

A further aspect of the present disclosure includes that at least one of the multiple of heaters is a laser.

A further aspect of the present disclosure includes that the deposition system comprises a deposition nozzle to generate the melt pool and a gas cooling jet to facilitate melt pool solidification.

A method for in situ stress relief of a workpiece according to one disclosed non-limiting embodiment of the present disclosure includes additive manufacturing a workpiece on a build plate; sensing a temperature of the workpiece; and heating the workpiece at a location between a melt pool and the build plate in response to the sensing during the additive manufacturing.

A further aspect of the present disclosure includes that the sensing is performed at a vertical height on the workpiece between the melt pool and the build plate.

A further aspect of the present disclosure includes that the sensing comprises sensing the temperature of the workpiece at a multiple of positions around the workpiece.

A further aspect of the present disclosure includes that the heating comprises heating the workpiece at a multiple of positions around the workpiece.

A further aspect of the present disclosure includes that the heating comprises reducing a thermal gradient of the workpiece between the melt pool and the work piece.

A further aspect of the present disclosure includes that the temperature is uniform between the melt pool and the build plate.

A further aspect of the present disclosure includes that the thermal gradient is 2500 degrees F. at the melt pool and 800 degrees F. at the build plate.

The foregoing features and elements may be combined in various combinations without exclusivity, unless expressly indicated otherwise. These features and elements as well as the operation thereof will become more apparent in light of the following description and the accompanying drawings. It should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
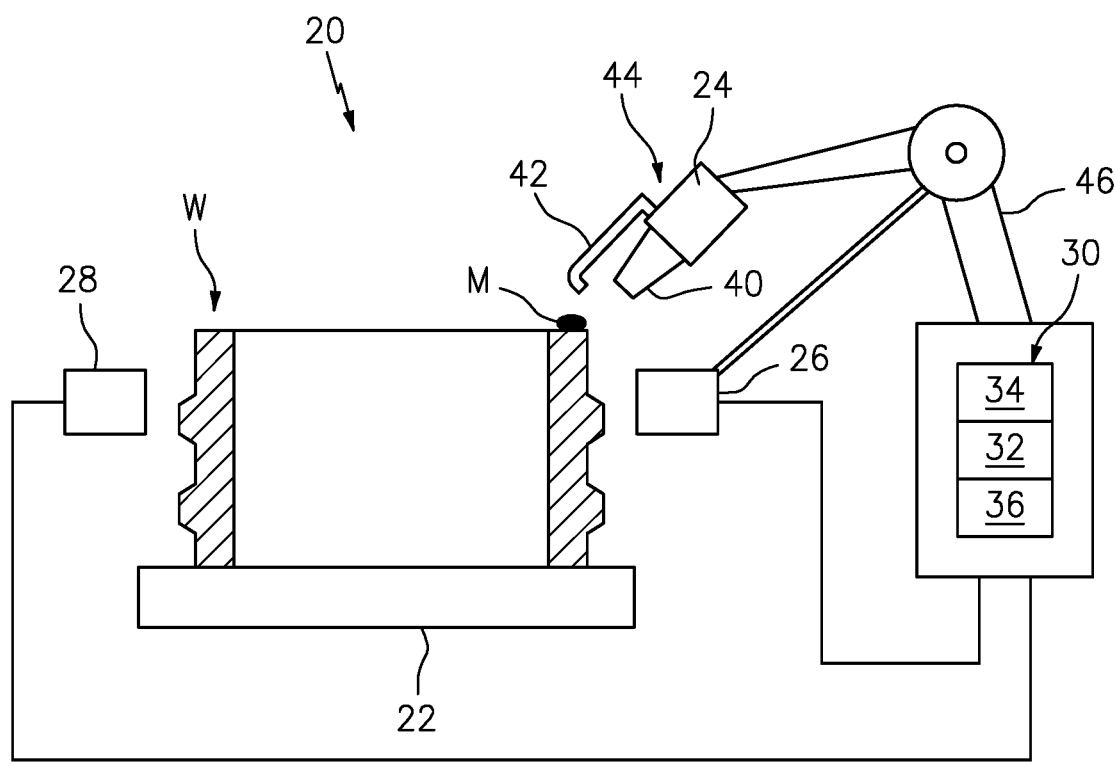
FIG. 1 is a general schematic view of an additive manufacturing system according to one disclosed non-liming embodiment.

FIG. 1 schematically illustrates an additive manufacturing system 20. The system 20 generally includes a build plate 22, a deposition system 24, a heater system 26, a sensor system 28 and a control system 30. The additive manufacturing system 20 builds components by consecutively melting layers of atomized alloy powder material to create the 3-D solid body workpiece W defined by a CAD file. Various metallic powders may be used, including iron, nickel, cobalt, titanium or aluminum-base alloys. Alloy 625, Alloy 718 and Alloy 230 may be used for components that operate in a high temperature environment such as is typical of aerospace and gas turbine engine components. As defined herein, "additive manufacturing" includes but is not limited to, Laser Freeform Manufacturing Technology (LFMT), Selective Laser Melting (SLM), Powder-Bed Electron Beam Melting (EBM), Electron Beam Free Form Fabrication (EBF3), Laser Engineered Net Shape (LENS), and others.

Figure 2:
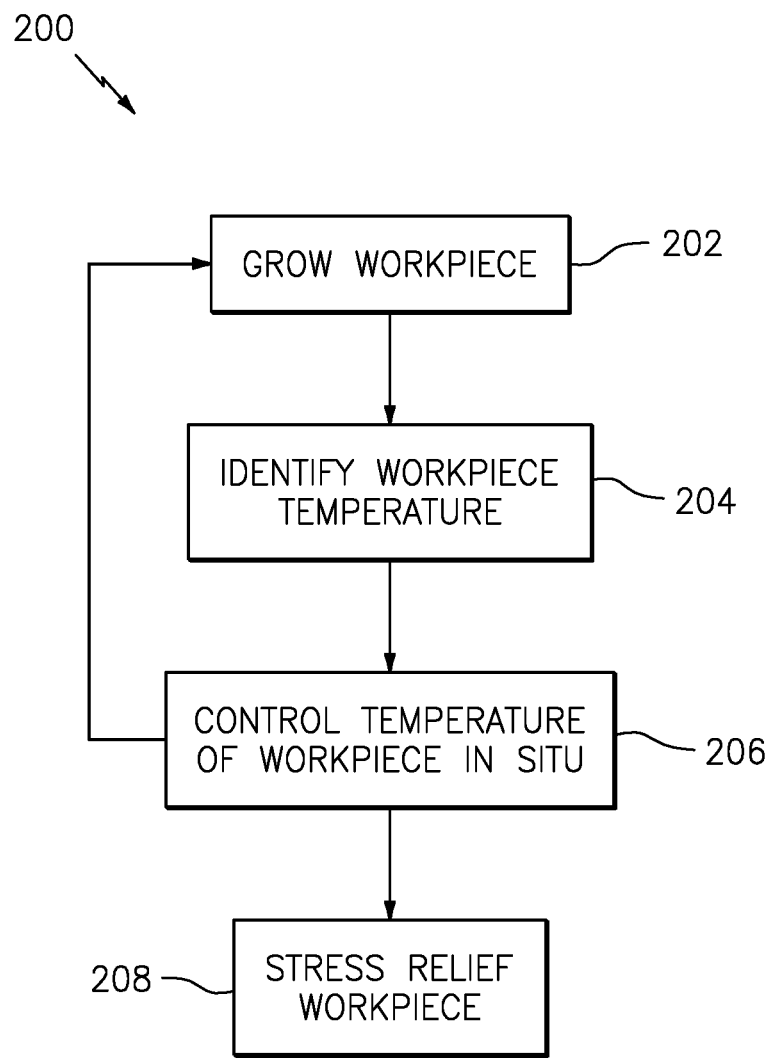
FIG. 2 is an additive manufacturing build process with in situ stress relief.

The control system 30 includes a processor 32, a memory 34, and an interface 36. The processor 32 may be any type of microprocessor having desired performance characteristics. The memory 34 may include any type of computer readable medium which stores the data and control algorithms described herein such as the in-situ stress relief method 200 (FIG. 2). Other operational software for the processor 32 may also be stored in the memory 34 to provide both manual and automatic programmable logic controller (PLC) inputs. The interface 36 facilitates communication with other subsystems such as the deposition system 24, the heater system 26, and the sensor system 28.

The deposition system 24 includes a deposition nozzle 40 to generate a melt pool M and a gas cooling jet 42 to facilitate solidification of the melt pool M. The deposition nozzle 40 may direct a laser, electron beam, plasma arc, or other energy source. The gas cooling jet 42 may direct air or an inert gas. The deposition nozzle 40 and the gas cooling jet 42 are located on a deposition head 44 which is robotically manipulated by a motor drive 46 in response to the control system 30. The motor drive 46 may control the deposition head 44 within a coordinate system such that an example 6-axis machine has the ability to interpolate linearly for X, Y, Z, and rotationally A, B, and U. The functions of the motor drive 46 may be integrated into the control system 30 for positioning the deposition head 44. The control system 30 is operable to continually determine the position of the deposition head 44 with respect to the coordinate system.

Figure 3:
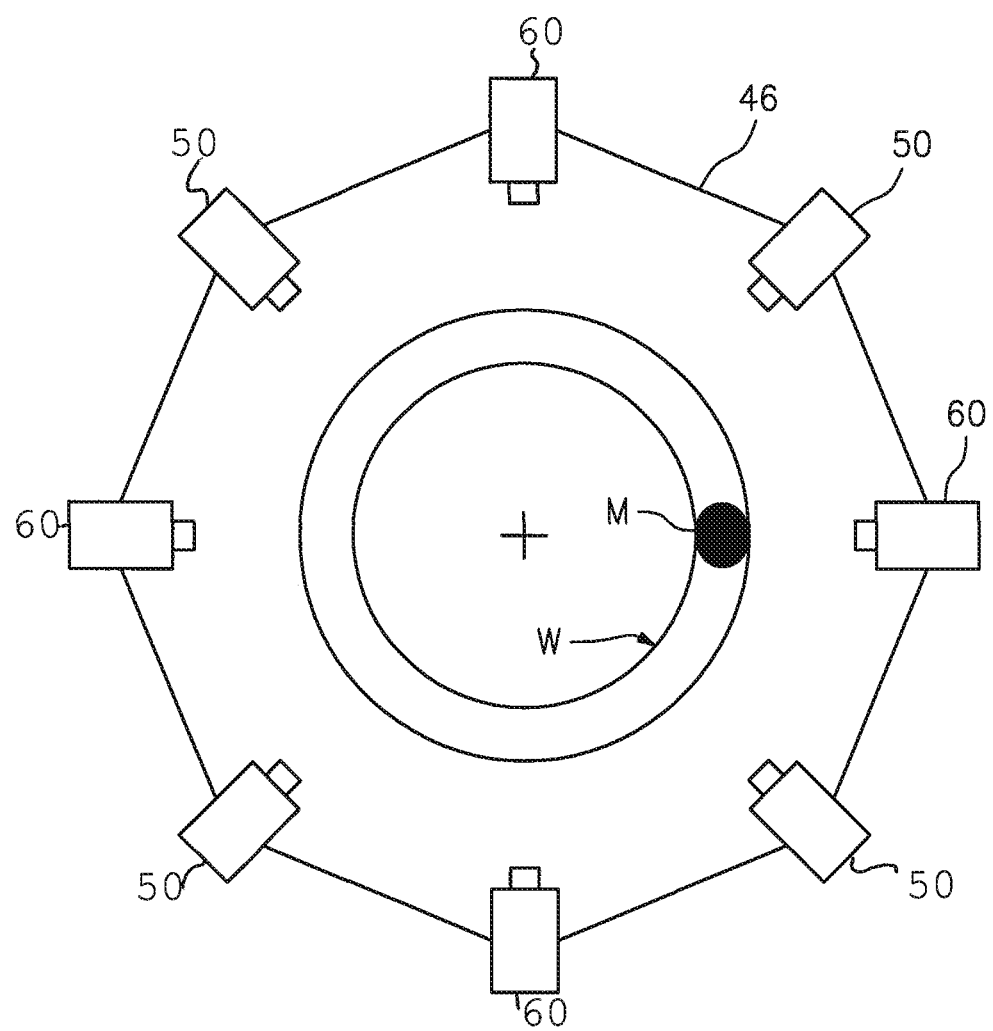
FIG. 3 is a top view of the additive manufacturing system.

The sensor system 28 and the heater system 26 may be robotically manipulated in conjunction with the deposition system 24 by the control system 30 to maintain a desired position with respect to the deposition system 24. The sensor system 28 may include a multiple of temperature sensors 50 that alternate with a multiple of heaters 60 of the heater system 26 positioned around the workpiece W (FIG. 3). The temperature sensors 50 are operable to identify a heat signature of the workpiece W. The temperature sensor 50 may be, for example, a thermal camera, an infrared camera, a semiconductor-based temperature sensor, or other measurement device. The heaters 60 may be, for example, an infrared heater, a laser, or other device to heat the workpiece and provide internal stress relief.

With reference to FIG. 2, the method 200 for in situ additive manufacturing stress relief is schematically disclosed in terms of a functional block diagram flowchart. It should be appreciated that alternative or additional steps may be provided without departing from the teaching herein.

Figure 4:
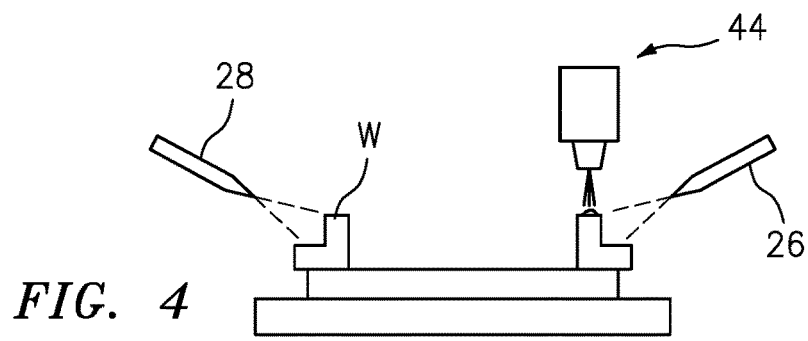
FIGS. 4-6 are build process steps in the additive manufacturing build process.
Figure 5:
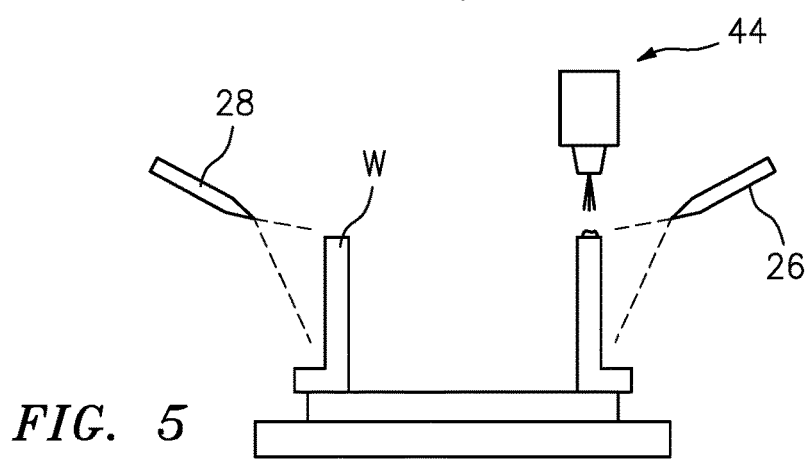
Figure 6:
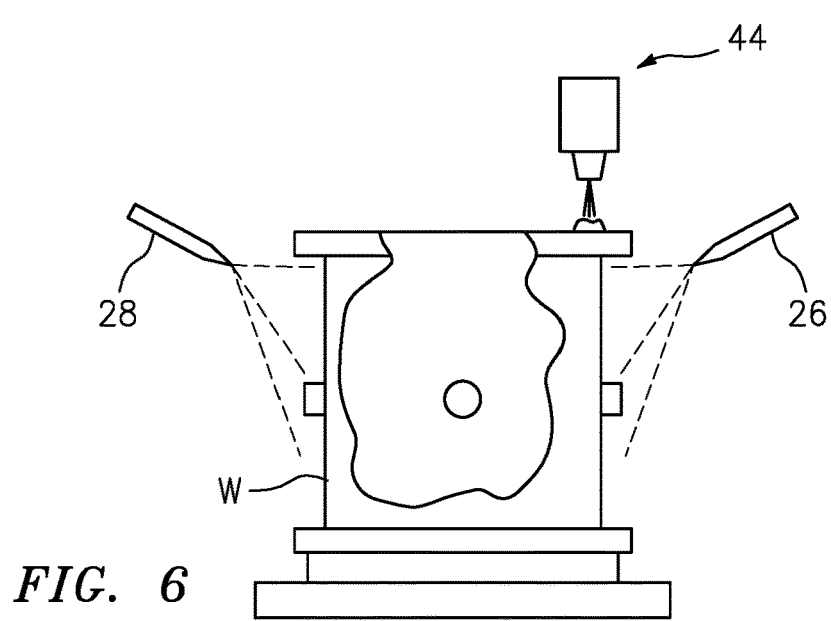

Initially, in one embodiment, the workpiece W is grown (202; FIGS. 4-6) by consecutively melting layers of atomized alloy powder material applied to the build plate 22 by the deposition system 24. In some embodiments, it may be desirable to use an inert cooling gas jet to accelerate the solidification of the melt pool M to mitigate excessive grain grown. Generally, finer grain size provides greater ductility and fatigue life.

As the workpiece W is grown, the temperature sensors 50 identify the temperature of the workpiece W which trails the melt pool M. The heater system 26 then heats the workpiece W to elevate the workpiece W temperature to reduce the thermal gradient of the workpiece W and relax residual stress in situ during the additive manufacturing build process.

During the additive manufacturing build process, the heater system 26 controls (206) the temperature of the workpiece W to provide localized stress relief by elevating the workpiece temperature in the areas below the melt pool M that are subject to high residual stresses. Such high residual stress areas may include features such as abrupt thickness changes, holes, or support structure adjacent to the build plate 22. Stress relief temperatures are lower than the point at which the phase change occurs. In steels and nickel alloys, stress relief can take place at temperatures between 500-1300 degrees F. (260-704 degrees C.). For aluminums, temperatures between 300-600 degrees F. (149-316 degrees C.) are more typical. Stress relief temperatures are highly alloy dependent and stress relief occurs more rapidly at the higher end of the temperature ranges.

During the additive manufacturing build process, the workpiece W may be heated by the heater system 26 to an intermediate temperature, such that the internal stresses are mitigated sufficiently to counteract cracking and tearing. For example, a temperature gradient in the workpiece W may be defined from the melt pool M deposition surface to the bottom of the workpiece W. A temperature gradient may conventionally be 2300 degrees F. (1260 degrees C. over 1 inch of vertical distance on the workpiece W. That is, the melt pool M deposition surface is 2500 degrees F. (1371 degrees C.) and 200 degrees F. (93 degrees C.) at 1 inch (25 mm) below the melt pool M deposition surface. The temperature at the build plate 22 may be below 200 degrees F. (93 degrees C.

Figure 7:
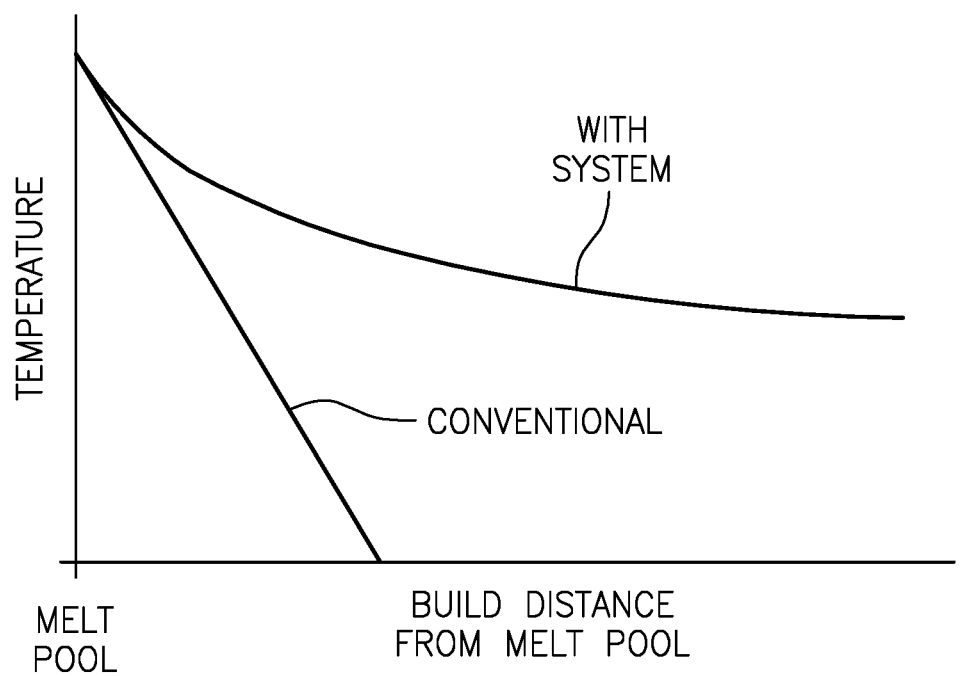
FIG. 7 is a graphical representation of a thermal gradient in an additive manufactured workpiece manufactured with the system according to one disclosed non-limiting embodiment compared to a thermal gradient in a conventional additive manufactured process.

With the system 20, the temperature gradient is reduced to 1700 degrees F. (927 degrees C.) between the melt pool M deposition surface and the build plate 22. That is, the workpiece at the melt pool M deposition surface is 2500 degrees F. (1371 degrees C.) while the workpiece is 800 degrees F. (227 degrees C.) adjacent to the build plate 22 (FIG. 7). For a lower temperature material, such as aluminum, the molten melt pool M temperature may be 1500 degrees F. (816 degrees C.) and the workpiece adjacent to the build plate may be 350 degrees F. (177 degrees C.). The temperature gradients may be specifically tailored for each workpiece alloy. The resultant reduced thermal gradient over the build height of the workpiece W moderates thermal shock and reduces the potential for cracking and separation from the build plate 22. In other examples, the temperature of the workpiece W may be maintained at a uniform temperature between the melt pool M and the build plate at 1200-600 degrees F. (649-316 degrees C.) for steel and nickel alloys, or at 300 degrees F. (149 degrees C.) for aluminum alloys.

Finally, a complete stress relief operation (208) may then be performed on the finished workpiece W in a separate heat treat oven after the additive manufacturing build process is complete.

The use of the terms "a," and "an," and "the," and similar references in the context of description (especially in the context of the following claims) are to be construed to cover both the singular and the plural, unless otherwise indicated herein or specifically contradicted by context. The modifier " " used in connection with a quantity is inclusive of the stated value and has the meaning dictated by the context (e.g., it includes the degrees of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the equipment and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. An additive manufacturing system, comprising:
   a build plate;
   a deposition system operable to dispense material as a melt pool to additively manufacture a workpiece on the build plate;
   a sensor system comprising a multiple of temperature sensors arranged adjacent to the build plate, the sensor system operable to determine a temperature of the workpiece during additive manufacturing of the workpiece, the sensor system operable to identify the temperature of the workpiece adjacent to the melt pool location at a vertical height on a side of the workpiece between the melt pool and the build plate, at least one of the multiple of temperature sensors is an infrared camera;
   a heater system comprising a multiple of heaters arranged adjacent to the build plate to alternate with the multiple of sensors, the heater system operable to selectively heat the workpiece at a vertical height on a side of the workpiece between the melt pool and the build plate at a residual stress area during the additive manufacturing thereby providing localized stress relief, at least one of the multiple of heaters is a laser; and
   a control in communication with the sensor system and the heater system, the control operable to control the heater system in response to the temperature measured on the workpiece by the sensor system to reduce a temperature gradient of the workpiece at the residual stress area between the melt pool and the build plate.

2. The system as recited in claim 1, wherein the deposition system comprises a deposition nozzle to generate the melt pool and a gas cooling jet to facilitate melt pool solidification.

3. The system as recited in claim 1, wherein the sensing comprises sensing the temperature of the workpiece at a multiple of positions adjacent to the workpiece.

4. The system as recited in claim 1, wherein the heating comprises heating the workpiece at a multiple of positions adjacent to the workpiece.

5. The system as recited in claim 1, wherein the temperature is uniform between the melt pool and the build plate.

6. The system as recited in claim 1, wherein the temperature of the workpiece is about 2500 degrees Fahrenheit adjacent the melt pool location and about 800 degrees Fahrenheit at the workpiece adjacent the build plate.

7. The system as recited in claim 1, wherein heating the workpiece between the melt pool and the build plate at the residual stress area is an area on the workpiece separate from the melt pool.

8. The system as recited in claim 1, wherein heating the workpiece between the melt pool and the build plate at the residual stress area is an area on the workpiece below the melt pool.

9. The system as recited in claim 1, wherein the heating comprises heating the workpiece at the residual stress area separate from the melt pool.

10. The system as recited in claim 1, wherein the heating comprises heating the workpiece at the residual stress area which is below the melt pool.

11. The system as recited in claim 6, wherein heating the workpiece at the residual stress area provides temperatures between 500-1300 degrees Fahrenheit (260-704 degrees Celsius) for steels and nickel alloys, and between 300-600 degrees Fahrenheit (149-316 degrees Celsius) for aluminums.

12. The system as recited in claim 1, wherein heating the workpiece at the residual stress area provides heating the workpiece along a temperature gradient defined between the melt pool and a bottom of the workpiece at the build plate.

13. The system as recited in claim 12, wherein the workpiece at the melt pool deposition surface is 2500 degrees Fahrenheit (1371 degrees Celsius) while the workpiece is at 800 degrees Fahrenheit (227 degrees Celsius) adjacent to the build plate.

14. The system as recited in claim 12, wherein the workpiece at the melt pool deposition surface is 1500 degrees Fahrenheit (816 degrees Celsius) and the workpiece adjacent to the build plate may be 350 degrees Fahrenheit (177 degrees Celsius) adjacent to the build plate for a workpiece manufactured of an aluminum.

15. The system as recited in claim 1, wherein heating the workpiece at the residual stress area provides heating the workpiece to maintain a uniform temperature between the melt pool deposition surface and a bottom of the workpiece at the build plate.

* * * * *